May 22, 1956 I. B. SERGE 2,746,419

DIAL MECHANISM

Filed Dec. 11, 1952 2 Sheets-Sheet 1

INVENTOR.
Igor B. Serge
BY [signature]
Att'y

INVENTOR.
Igor B. Serge
BY Leonard S. Chernofsky
Att'y

United States Patent Office 2,746,419

Patented May 22, 1956

2,746,419

DIAL MECHANISM

Igor B. Serge, Beverly Hills, Calif., assignor to Lear, Incorporated, Grand Rapids, Mich.

Application December 11, 1952, Serial No. 325,432

8 Claims. (Cl. 116—124.1)

This invention relates to tuning and band selecting mechanism for a radio receiver or the like. Specifically, it has reference to an arrangement intended primarily for a receiver of the multi-band type in which means are provided for conditioning the circuitry for reception over one or another of a plurality of individually selectible wave-bands by means of a band-selecting switch, whereupon tuning of the receiver to a specific frequency is accomplished by means of a variable condenser, slug tuner or other well-known means. Inasmuch as the tuning over a selected band requires the use of a dial graduated and marked for that band, the mechanism is desirably characterized by means for exposing to the operator only the dial then needed, and the masking of the unwanted dials.

Generally, the prior practice has been to arrange a circular dial and a shutter thereover in such manner that upon movement of the switch which modifies the circuit for operation over one band or the other, the shutter is moved to expose a series of graduations on the dial corresponding to the selected band. However, if the receiver is one designed for operation over an unusually wide range, a circular dial divided into the usual sectors or concentric circles, one for each band, then becomes inordinately large. During recent years there has been a decided trend toward miniaturization of radio equipment, particularly those used in the field during warfare. In such cases the drastic reduction in conventional dimensions has ruled out the use of conventional, circular, tuning dials for multiband operation. For example, in the miniaturization of the well-known United States Army Signal Corps Receiver Model BC–348, the employment of the dial mechanism of this invention enabled a reduction in dimensions from 6″ x 7″ x 2″ to 1″ x 3.5″ x 4.1″ or volume-wise from 84 cubic inches to 14.4 cubic inches.

Having the foregoing desiderata in view, one of the important advantages of the instant invention resides in providing a dial mechanism for a multi-band radio receiver which shall occupy a minimum volume, shall perform consistently and reliably, shall be mechanically simple and provide a presentation which is legible under subnormal viewing conditions.

At this juncture, it is pointed out that while this specification may, exemplificatively, make reference to a radio receiver, the invention is not to be regarded as necessarily limited thereto, since all or some of the elements thereof may be found equally adaptable to other apparatus, e. g. a television receiver.

As an indication of an environment to which the invention may be adapted, one embodiment thereof has been utilized in a radio receiver having six wave bands. The specification recited that for the band from 6.0 to 9.5 mc./s. the maximum dial density could be only 520 kc. per inch, or 6.73 inches of dial length for the entire band. However, by the use of the invention and suitable gearing an arrangement was provided which moved the dial 14.24 inches for 180° of rotation of the capacitor, and the dial density was then only 246 kc. per inch or twice as readable as the specification allowed.

In general, the invention, in one aspect, contemplates the provision of a prestressed, elongated dial band or strip of tempered metal or other equivalent material in coil form capable of being rolled and unrolled upon itself, as a defined flat length thereof is utilized, and without the use of an arbor. A preferred arrangement for feeding the band past a fixed index comprises sprockets and marginal apertures in the tape. The feed of the band may be in a horizontal or vertical sense, and suitably shaped receptacles or guides are provided for receiving the coiled ends of the band, there being an intermediate flat zone of the band opposite a viewing window which includes the index. The scales for the several wave bands are parallelly positioned in columns on the dial strip and in any suitable manner, e. g. by silk-screening white graduations and characters on a black background. While the arrangement just broadly described is capable of use for only a single scale, i. e. a single band, the invention finds its ideal application in multi-band receivers. In such case, two alternative embodiments are disclosed: one in which the dial strip is transversely immovable and means are provided for moving the window, and the other in which the dial strip is translatable laterally and the window is fixed.

In another aspect the invention contemplates means for mounting the dial strip or the window, as the case may be, for lateral translation coordinately with the band switch.

While some of the objects of the invention have been noted hereinbefore, other objects will become apparent from the following description which, taken in connection with the accompanying drawings, discloses preferred embodiments of the invention.

Figure 1:
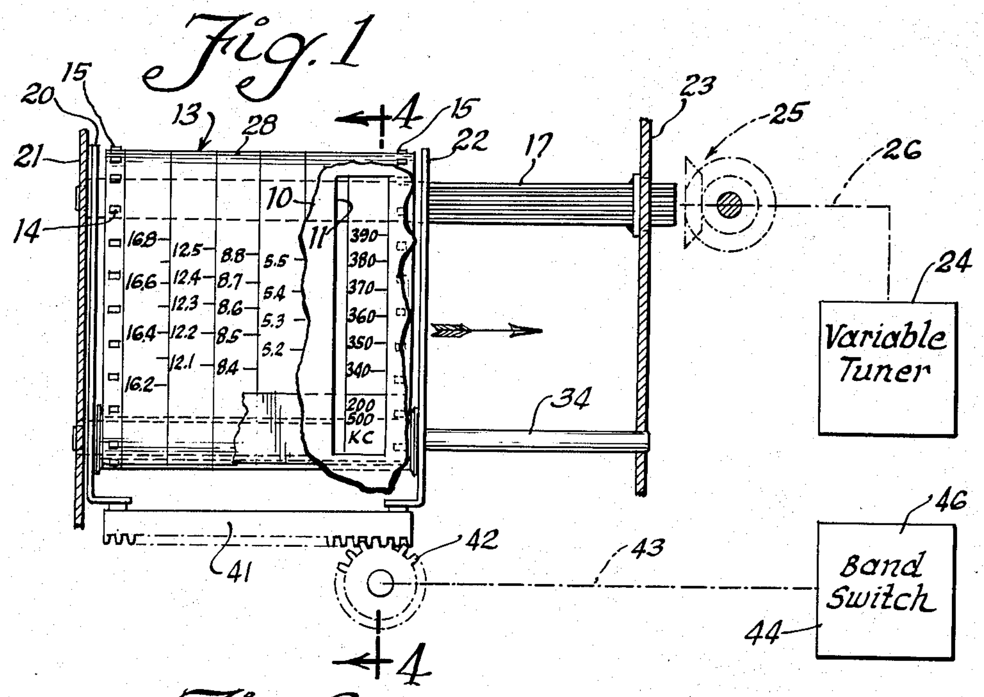
Fig. 1 shows a front elevational view of a dial mechanism in accordance with one aspect of the invention, in which the window is fixed and the dial strip is arranged for lateral shifting in response to band-switching.

Turning first to Fig. 1, there is shown a portion 10 of the front panel of a radio receiver having a window or opening 11 through which a predetermined extent of the dial indicia may be viewed. The customary index (not shown) may be mounted across, or to one side of, the window. In this embodiment the window 11 is fixed, and the dial strip is arranged to be moved in two orthogonal senses, e. g. vertical and horizontal.

The dial strip 13 is in the form of a band or strip of metal, plastic composition or other material capable of having tension or resiliency imparted thereto in the manner of a coiled spring. One preferred form of band comprises a self-coiling stainless steel strip of 0.0025 inch in thickness, approximately 2¼ inches in width and 28 inches in length formed into a coil approximately ½ inch in outside diameter and 9⁄32 inch inside diameter.

One successful method of producing the self-coiling characteristic consists of passing a strip of tempered, spring stock, under tension, over a fixed, rigid, thin, forming blade having a semi-cylindrical edge of 1/32" radius. Prior to the coil-inducing operation a suitable handle is clamped to each end of the strip and the strip doubled upon itself over the blade. Then by drawing the strip from one end to the other while maintaining heavy contact thereof with the blade the requisite tight curl is imparted.

The background and frequency indicia may be applied to the strip in any well-known manner e. g. by lightly etching the metal, applying black lacquer to one side, and silk-screening the letters in white upon the black background. Allowing approximately 3/16" on each margin of the strip for the sprocket perforations to be detailed, the remainder of the width may be divided into six bands, each approximately 5/16" in width.

Figures 2, 3:
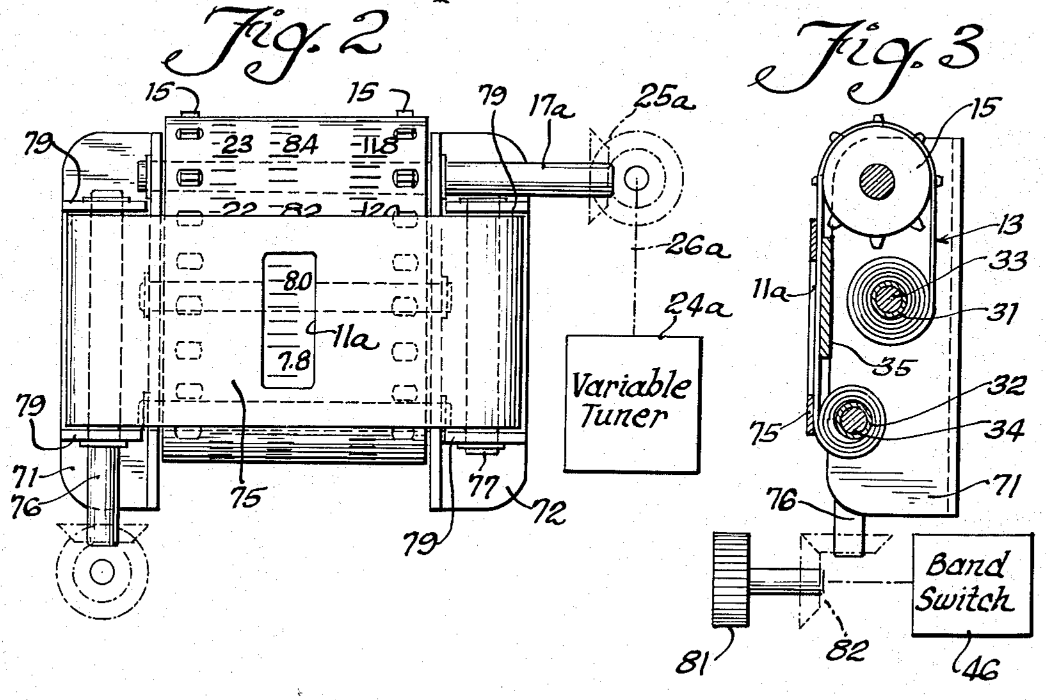
Fig. 2 shows a front elevational view of an alternative embodiment in which the dial strip remains laterally fixed, and the window is shiftable in response to band-switching.
Fig. 3 is a side elevational view of the showing of Fig. 2.

Fig. 3 is, in fact, a side view of an alternative form of the invention but since the same, in most of its details, represents also the dial strip and drive therefor incorporated in the embodiment of Fig. 1, this figure will be allowed to serve a dual purpose. Thus, the margins of the strip (Fig. 1) are provided with equally-spaced perforations 14 for engagement with the teeth of a pair of driving sprockets 15—15. Preferably the sprockets are secured to a common sleeve for preserving mutual spacing thereof, and each is provided with a splined hole (not shown) for keying engagement with a correspondingly splined shaft 17 supported for rotation in framework portions 21 and 23. Rotation of the shaft 17 is coordinated with the movement of the variable tuner 24, e. g. a condenser, by means of gearing 25 and 26. Such gearing is so designed that utilization of one of the scales 28 from one extreme end thereof to the other will correspond to the full range of the tuner 24.

The self-coiling character of the strip 13, at least if prepared according to the method outlined hereinabove, will provide two tightly coiled ends therefor (Fig. 3) which are fitted over idler sleeves 31 and 32 freely rotatable on spindles 33 and 34 in order to minimize the friction of coiling and uncoiling. A straight extent or lay of the strip is provided, and is arranged to overlie a pad 35 secured between the frame members 20 and 22, of the laterally-shiftable carriage to be described. The inherent self-coiling tendency of the band may evidence itself as an outward bulge over the straight path thereof from the sprocket 15 to the spindle 34 and, since such bulge is restrained by, and readily yields to, the panel 10, the strip will present a flat, undistorted easily read area to the window 11. Rotation of the shaft 17 via the tuner 24 is effective through the sprockets 15—15, to traverse the band over its entire range. Obviously the whole length of the band must be such that complete presentation of its indicia will leave at least one turn of the band on each spindle 33 or 34. The positive stops always provided on the tuner 24 may be relied upon to limit the travel of the strip 13 at its end points.

A carriage is provided to enable lateral shifting of the band 13, the sprockets 15—15, the spindles 33 and 34 and the sleeves 31 and 32. Thus, the carriage frame members 20 and 22 are secured in any convenient way to each other and to a rack 41 in mesh with a pinion 42. This latter is, in turn, arranged to be rotated through suitable connections 43 by the band switch 46. Assuming six wave bands the switch 46 will have six positions, actuation thereof to any selected position being translated into lateral shifting of the carriage. Preservation of the driving relation of the sprockets 15—15 with the tuner 24 is effected through splined shaft 17, which acts also as an upper transversely positioned guide. The lower guide is constituted by the spindle 34 which is extended between the frame members 21 and 23.

Figures 4, 5, 6:
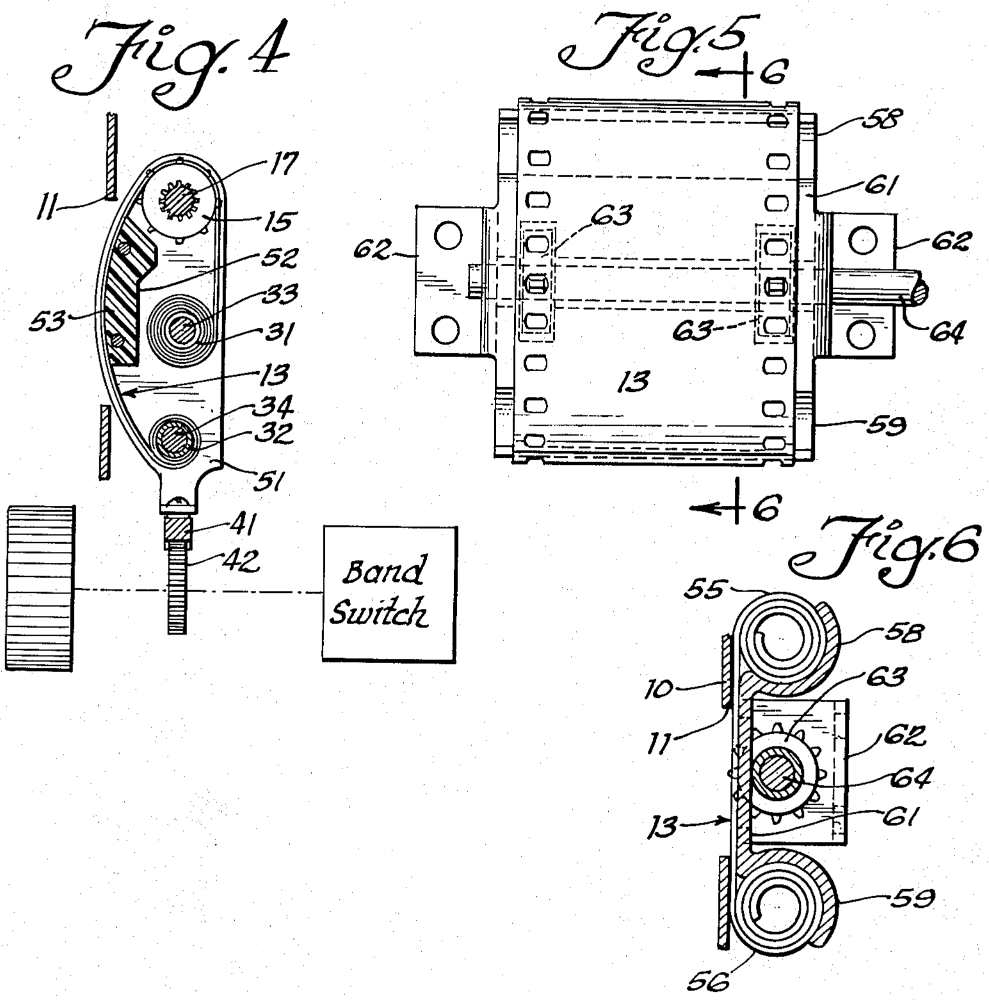
Fig. 4 is a cross-sectional showing of an alternative arrangement for the dial band.
Fig. 5 shows a front elevation of an alternative arrangement receiving the ends of the dial strip.
Fig. 6 is a cross section taken on the line 6—6 of Fig. 5.

Illustrated in Fig. 4 is a slightly modified version of the form of the invention of Fig. 1 in which like parts carry like reference numerals. Secured to, and intermediate the carriage side members 51—51 (only one being shown), is the block 52 having a cylindro-convex forward surface 53 over whice the dial strip 13 is arranged to slide. The convexity 53 is of such radius as to direct the strip 13 slightly outwardly of the window 11, thus to render viewing thereof materially easier, especially from above.

Figs. 5 and 6 represent a modified form of strip-traversing mechanism in which the self-coiling termini 55 and 56 of the dial strip are arranged to be received in substantially semi-cylindrical trough-like elements or receptacles 58 and 59, the longitudinal diametrical midplane whereof is disposed at an angle of approximately 45° to the horizontal. These latter preferably form endwise attachments to a flat body part 61 having ears 62—62 fastening the dial to the chassis of the receiver. In this embodiment traverse of the dial strip 13 is effected by the sprockets 63—63 driven by the shaft 64, and in the manner previously explained. It will be clear that seating of the coiled ends 55 and 56 in the receptacles 58 and 59 is insured by the tendency of these two ends to approach each other in accordance with the self-coiling quality of the entire band. Furthermore it will be comprehended that the entire assembly of Figs. 5 and 6 may be in the form of a carriage and capable of horizontal shifting as explained in connection with Fig. 1.

A further modification of the invention is shown in Figs. 2 and 3. In this instance the dial strip is nonmovable in a lateral sense, but the window is arranged to be shifted, in the manner of a shutter, to confront a selected column of indicia. Two side members 71 and 72 are attached to the chassis by any convenient means (not shown), and support the shaft **17*a* which is driven from the tuner 24*a* by means of shafting 26*a* and gears 25*a*. Sprockets 15 are keyed to the shaft 17*a*, and are engaged in the marginal perforations of the self-coiling dial strip 13** for longitudinal movement thereof in the manner heretofore detailed. Either of the means of Figs. 3 or 6 may be availed of to control the coiling of the ends of the strip, and as will be apparent from the preceding description.

In this embodiment the scale-viewing window is constituted as an opening **11*a* cut into a transverse band or shutter 75 which is preferably of the same character as the strip 13. Inasmuch as lateral shifting of the window 11*a* is limited to the width of the strip 13, it is possible to impart the required movement to the shutter 75 simply by securing one end thereof to a spindle 76 and rotating the same in one direction or the other. A fixed or movable spindle 77 may then be provided about which the opposite end of the strip will wind itself. Support for the spindles 76 and 77 is afforded by lugs 79 extending forwardly from the members 71 and 72. Spindle 76 is rotated in synchronism with the band switch 46 by the knob 81 and gearing 82. Accordingly, upon rotation of the switch 46 to one of its detent positions, the window 11*a* is indexed to a desired position confronting a selected wave band of the dial strip. It will be understood that the arrangement of the parts is such that positive alignment of the window 11*a* with a selected column of the dial strip will occur at the corresponding detent position of the band switch 46**.

One of the salient advantages of the dial strip resides in the absence of sliding contact between contiguous coils as the band winds upon itself, thereby minimizing by a substantial degree, abrasion and consequent illegibility, of the dial indicia. However, some friction will exist between the strip and fixed elements in contact therewith, e. g. the trough 58 and 59. It has been found that coating the strip with "Teflon," a commercial form of polytetrafluoroethylene tends to reduce such friction. Where the dial band moves past the panel 10 or other equivalent guiding face, it is a simple matter to apply pile fabric or flocking to reduce the sliding friction.

While I have shown particular embodiments of my invention, it will be understood, of course, that I do not wish to be limited thereto since many modifications may be made, and I therefore contemplate by the appended claims to cover any such modifications as fall within the true spirit and scope of my invention.

Having thus described my invention, what I claim and desire to secure by Letters Patent is:

1. Dial mechanism comprising an elongated, self-coilable strip having a plurality of longitudinally-extending columns of indicia thereon, a carriage for supporting said strip for longitudinal movement, a panel confronting said strip having a window therein for exposing a selected one of said columns, means on said carriage receiving the coiled ends of the strip, means for longitudinally traversing the strip past the window, and means for imparting transverse movement to said carriage to present a selected column before the window.

2. Mechanism for presenting one of a plurality of scales, each corresponding to a function and for use with a device having means for selecting one of the functions comprising an elongated, self-coilable strip having a plurality of longitudinally extending scales thereon, a carriage for supporting said strip, a panel confronting said strip and having a window therein for exposing to view a selected one of said columns, means on said carriage for receiving the coiled ends of the strip, means on said carriage for longitudinally traversing the strip past the window, and means synchronized with the function-selecting means for shifting said carriage transversely of the window to present a selected column to view.

3. Dial mechanism comprising a longitudinally movable, elongated, self-coilable strip bearing a plurality of parallel columns of indicia thereon, means for receiving the coiled ends of the strip, means for supporting said strip-receiving means, a member confronting said strip and having a window therein, and means associated with at least one of said supporting means and member for effecting relative transverse displacement therebetween for positioning one of said columns and window in register.

4. Dial mechanism comprising a longitudinally-movable, elongated resilient strip treated and tempered to possess a self-coiling character whereby the ends of strip inherently coil tightly upon themselves, means for moving said strip, a pair of elements having a semi-cylindrical cavity each for receiving a said coiled end, a flat member intermediate said elements and to the inside of said strip and a panel adjoining the opposite face of said strip for directing said strip in a flat path in its passage from one element to the other, said panel having a window therein, said strip having a plurality of longitudinally-disposed, selectible columns of indicia thereon, the dimensions of said window and of a single column being such as to present the indicia of a selected column for view in the window, and means for selectively moving said panel transversely of said strip to position said window before a selected column.

5. Dial mechanism in accordance with claim 4 in which said panel is also constituted as an elongated, self-coiling strip, and further characterized by means for receiving the coiled ends of said second strip.

6. Dial mechanism for use with a device in which a selected group of information is to be displayed for a selected function of the device comprising a strip-like member having a self-coiling characteristic and bearing a group of parallel, longitudinally disposed columns of information, an opaque, second strip-like member also having a self-coiling characteristic and having a window therein, means for traversing both members in mutually perpendicular directions, a pair of supports for each member for receiving the coiled ends thereof, said supports being spaced apart an amount such that said members intersect in flatwise adjacency, the indicia being on that face of said first member adjacent said second member, the dimension of the window measured in a direction transverse of said columns being such as to expose one column at a time, and means operatively connecting the means for moving said second member to the function-selecting means to position the window before a selected column while masking the unselected columns.

7. Dial mechanism for a radio receiver including a chassis, wave-band selecting means and means for tuning the receiver over a selected wave-band comprising a carriage mounted on said chassis for translational movement, a self-coilable band having a plurality of columns of indicia longitudinally thereof, means on said carriage for receiving the coiled ends of said band, said means being spaced apart a distance to provide a predetermined, substantially flat lay of said band intermediate said means, means operatively connected to the receiver-tuning means for moving said band longitudinally to traverse a selected column throughout its range past a fixed index on the chassis, a fixed panel confronting that side of the flat lay of the band on which the indicia appear and having a window therein, and means operatively connecting said carriage and wave-band selecting means for moving said carriage and its thereon-carried band past said window to present a selected one of said columns before said window.

8. Dial mechanism comprising a traversible, elongated, self-coilable strip having a plurality of columns of indicia disposed lengthwise thereof, means providing a window having a width equal to at least the maximum width of a column of indicia, said window having an index associated therewith for register with a selected one of said indicia upon movement of the strip, means at each end of the strip for storing the coiled ends thereof as the same coil and uncoil upon movement of the strip, means for imparting longitudinal movement to said strip for presenting the indicia seriatim to the index, and means for effecting relative movement between said window and strip in a direction transversely of the strip for framing the indicia of a selected one of said columns in the window as the strip is traversed.

References Cited in the file of this patent

UNITED STATES PATENTS

| | | |
|---|---|---|
| 1,555,743 | Ballenger | Sept. 29, 1925 |
| 1,734,068 | Ziola | Nov. 5, 1929 |
| 2,095,935 | Mitchell | Oct. 12, 1937 |

FOREIGN PATENTS

| | | |
|---|---|---|
| 411,713 | Great Britain | June 14, 1934 |
| 437,237 | Great Britain | Oct. 25, 1935 |